Sept. 5, 1967  K. J. LOWIN ET AL  3,339,986
HYDRAULIC CONTROL SYSTEM
Filed Oct. 22, 1965  2 Sheets-Sheet 2
FIG. 3
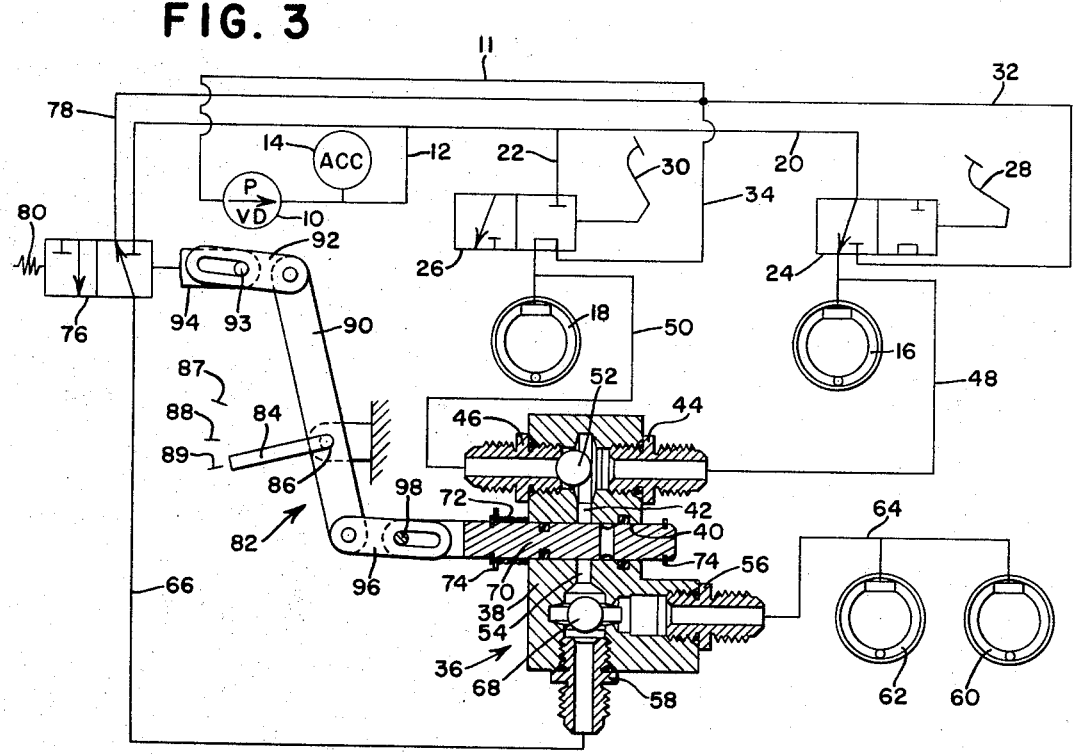
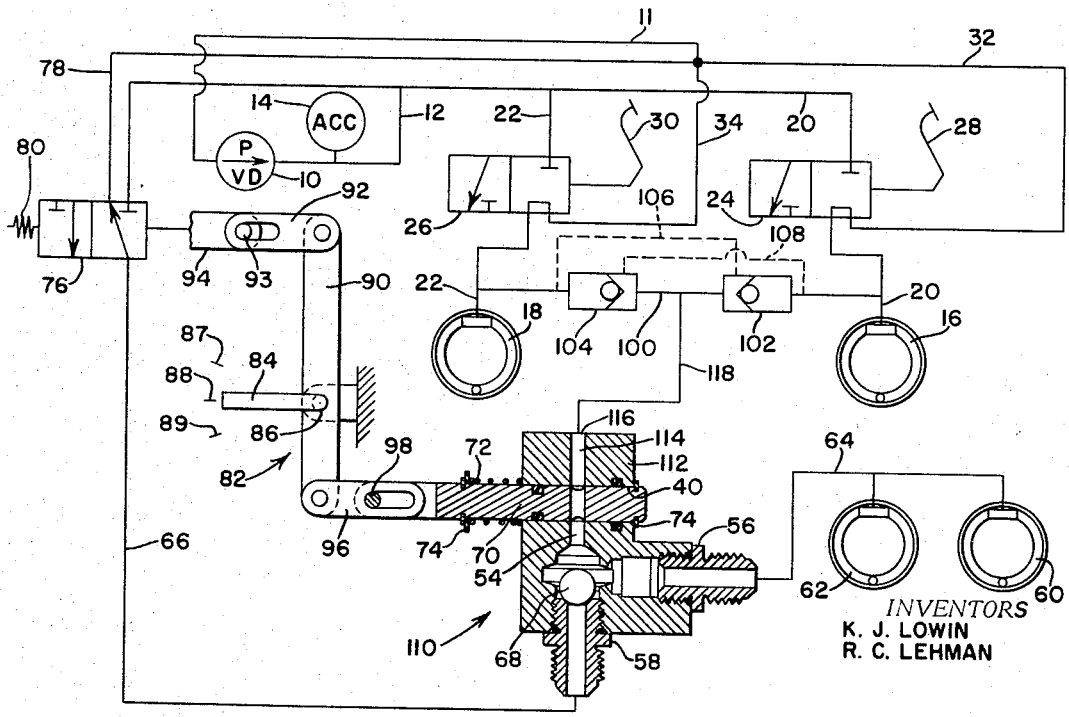
FIG. 4
INVENTORS
K. J. LOWIN
R. C. LEHMAN

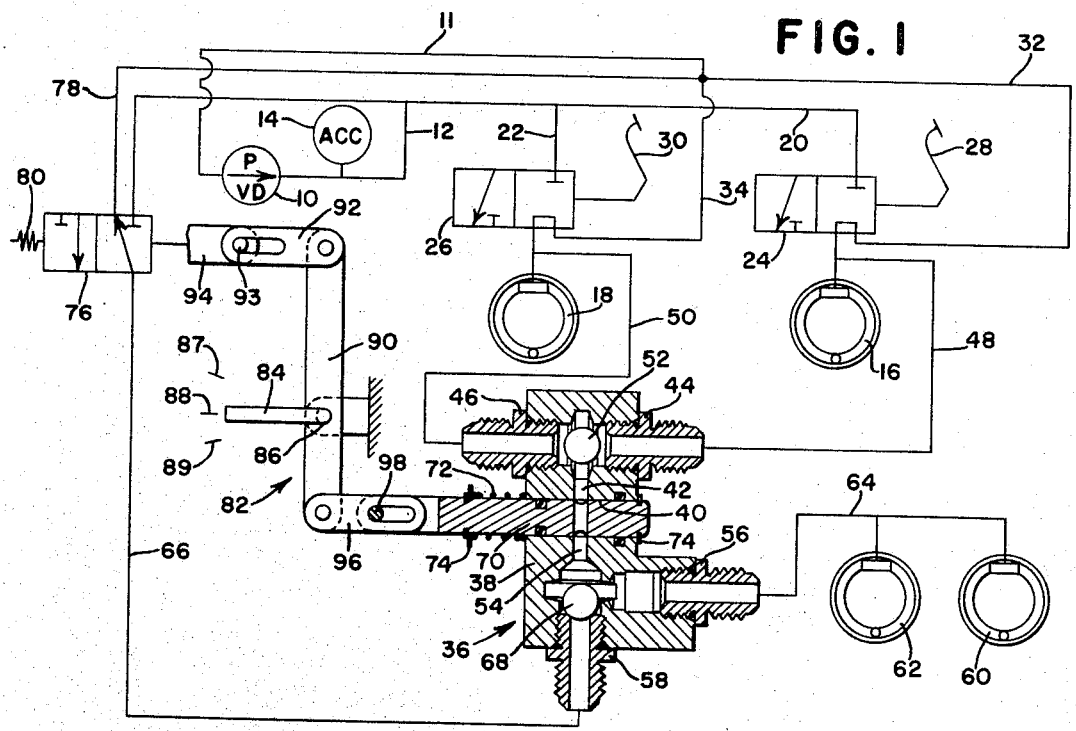
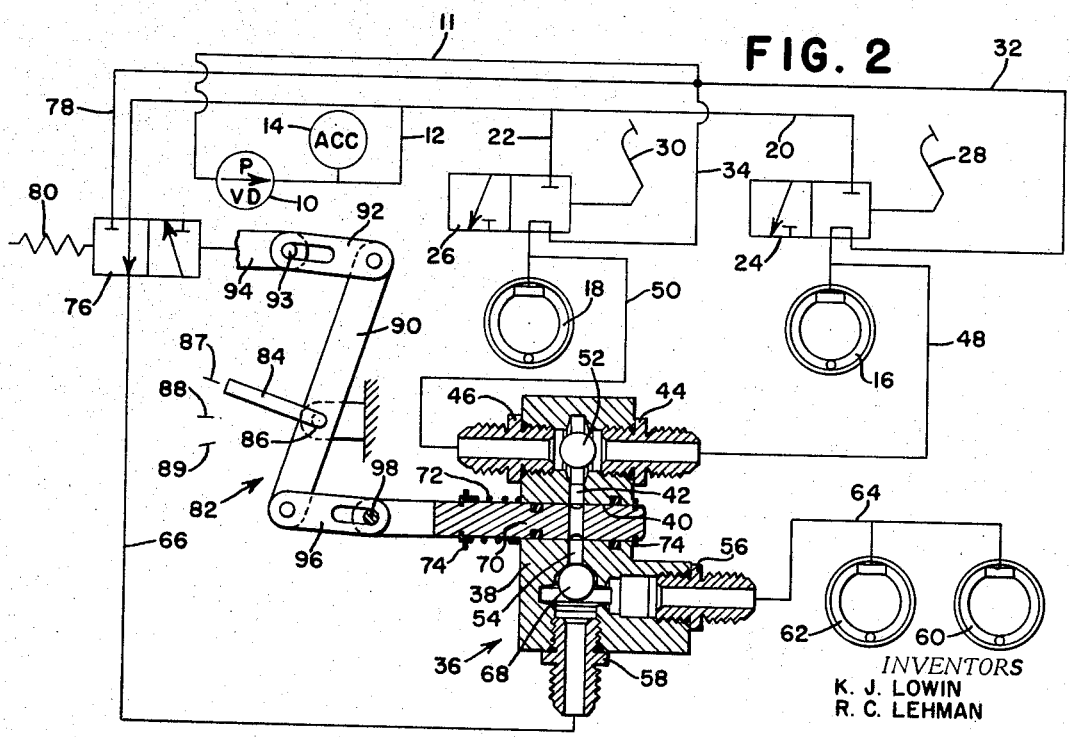

United States Patent Office 3,339,986
Patented Sept. 5, 1967

3,339,986
HYDRAULIC CONTROL SYSTEM
Kenneth J. Lowin and Robert C. Lehman, Cedar Falls, Iowa, assignors to Deere & Company, Moline, Ill., a corporation of Delaware
Filed Oct. 22, 1965, Ser. No. 502,133
9 Claims. (Cl. 303—7)

This invention relates to a hydraulic brake control system and more particularly to a system for controlling the hydraulic brakes on a tractor and a trailing vehicle.

An agricultural or industrial tractor conventionally has right and left rear wheel brakes which can be actuated separately or in unison. Also, many vehicles which are towed by such a tractor, such as a wagon or a scraper, are provided with brakes which are also controlled by the tractor operator, the trailing vehicle brakes generally being connected to the tractor brakes for smiultaneous actuation with the tractor brakes.

In some circumstances, such as when there is danger of jack-knifing, it is desirable that only the trailing vehicle brakes be applied, while in other circumstances, it is desirable that only the tractor brakes be applied, such as during the dumping of a trailer which requires a change in the distance between the tractor wheels and the trailer wheels during dumping. It is also desirable that either tractor brake be individually actuatable to facilitate sharp turns of the tractor or, for example, to facilitate the sidehill loading of a scraper.

While previous systems have been devised to provide such selective brake actuation, they have required a relatively large number of controls and have been difficult to operate and manufacture.

According to the present invention, an improved control system is provided for actuating the tractor brakes and the trailing vehicle brakes separately or in unison, while also providing for separate or joint actuation of the right- and left-hand tractor brakes.

Another object of the invention is to provide such a system which is compact, easy to manufacture, and simple to operate, and more specifically to provide such a system which only requires manipulation of a single lever in addition to the conventional brake pedals to produce the desired brake actuation.

Another object is to provide such a system which permits application of the various brakes in unison or in various sequences, and which requires no particular sequence for application of any set of brakes.

Still another object is to provide a novel selector valve and valve actuating mechanism in such a system for providing such selective brake actuation.

These and other objects will become apparent from the following detailed description and accompanying drawings wherein:

FIG. 1 is a schematic view of the brake control system positioned for simultaneous actuation of both the tractor and the trailing vehicle brakes.

FIG. 2 is similar to FIG. 1, except that the system is positioned for actuation of the trailing vehicle brakes only.

FIG. 3 is also similar to FIG. 1, except that the system is positioned for actuation of the tractor brakes only, one tractor brake being shown in an applied condition.

FIG. 4 is a schematic view similar to FIG. 1 but showing a slightly different embodiment of the invention.

The numeral 10 represents a typical variable displacement pump having an inlet line 11 and a discharge line 12 which preferably includes an accumulator 14. The numerals 16 and 18 respectively represent the right and left side tractor brakes, which are connected in parallel to the discharge line 12 by supply lines 20 and 22 respectively. A right tractor brake control valve 24 is interposed in the supply line 20, and a left tractor brake control valve 26 is interposed in the supply line 22, said valves being actuatable separately or in unison in the conventional manner by right and left brake pedals 28 and 30 between an open condition, wherein fluid pressure is supplied to the respective brakes 16 and 18, and a closed condition, as shown in FIG. 1, wherein the fluid flows from the right and left control valves 24 and 26 to the inlet line 11 via right and left return lines 32 and 34.

A selector valve 36 includes a valve body 38 having a cylindrical bore 40 communicating with an inlet line or conduit 42 which is bifurcated and connected to right and left inlet ports 44 and 46, the right inlet port 44 being connected to the right tractor brake supply line 20 between the tractor brake 16 and the control valve 24 by means of a right inlet line branch 48, and the left inlet port 46 being connected to the left tractor brake supply line 22 between the left tractor brake 18 and the left tractor brake conrol valve 26 by means of a left inlet line branch 50. A spherical type check valve 52 is mounted in the inlet line 42 at the bifurcation and prevents fluid flow from either the right or the left inlet line branch 48 or 50 into the other inlet line branch while permitting flow from either right or left inlet line branch 48, 50 to the inlet line 42 and valve bore 40.

The valve bore 40 also communicates with an outlet line 54 which is also bifurcated and connected to first and second outlet ports 56 and 58. The numerals 60 and 62 represent a pair of trailing vehicle brakes connected in parallel to the first outlet port 56 by means of a conduit 64. The second outlet port 58 is connected to the discharge line 12 by a conduit 66. A spherical type check valve 68 is mounted in the outlet line 54 at the bifurcation to permit flow of fluid from the conduit 66 or the outlet line 54 to the conduit 64 while preventing the flow of fluid between the conduit 66 and the outlet line 54. A spool-type valve 70 is shiftable in the bore 40 between a first position, wherein it connects the inlet line 42 to the outlet line 54, as shown in FIG. 1, and a second position, wherein it blocks the flow of fluid from the inlet line 42 to the outlet line 54, the valve being biased toward its first position by a spring 72 acting between a valve body 38 and a retaining ring 74 on the valve 70. The movement of the valve 70 in the direction of the spring bias is limited by a stop 74 which engages the valve body 38 in the first position of the valve.

A control valve 76 is interposed in the conduit 66 and is shiftable between an open position, as shown in FIG. 2, and a closed position, as shown in FIG. 1, wherein the conduit 66 is connected to the pump inlet line 11 by means of a return line 78, the control valve 76 being biased toward its closed position by a spring 80.

The positions of the valve 70 and the control valve 76 are established by a single actuating mechanism indicated generally by the numeral 82. The actuating mechanism 82 includes a lever arm 84 connected to and rotatable with a rock shaft 86 about the rock shaft axis between a first position indicated by the line 87, a second position indicated by the line 88, and a third position indicated by the line 89. The rock shaft 86 rotates a member 90, which has one end connected to the control valve 76 by a lost-motion mechanism, here shown as a slotted member 92 pivotally mounted on the member 90 and having a slot engaging a pin 93 on a member 94, which is connected to the valve 76. The other end of the member 90 is connected to the valve 70 by means of a second lost-motion mechanism, here shown as a pin 98 mounted on the valve 70 and slidably engaging a slotted member 96, which in turn is pivotally connected to the end of the member 90.

In operation, when the actuating mechanism is in its second position, as shown in FIG. 1, the selector valve 36 is in an open condition and the control valve 76 is in a closed position, whereby the depression of either or both brake pedals 28 or 30 will actuate both trailing vehicle brakes 60 and 62 as well as the particular tractor brake 16 or 18, which is connected to the depressed pedal 28 or 30. For example, if the right brake pedal 28 is depressed, the right tractor brake 16 is actuated and the pressure in the right tractor brake supply line 20 is transmitted to the right inlet port 44 by means of the right inlet line branch 48. The check valve 52 seats against the left inlet port 46, preventing the flow of fluid to the left inlet line branch 50, while permitting the flow of fluid through the inlet line 42, the valve 70, the outlet line 54, the first outlet port 56, and the conduit 64, to the trailing vehicle brakes 60 and 62. The check valve 68 seats against the second outlet port 58 preventing the return of fluid through the conduit 66. Conversely, if only the left brake pedal 30 is depressed, the check valve 52 will prevent the flow of fluid through the right inlet line branch 48 to the right brake 16 while permitting the flow of fluid through the selector valve 36 to the trailing vehicle brakes 60 and 62. The depression of both brake pedals 28 and 30 will, of course, actuate both tractor brakes 16 and 18, as well as the trailing vehicle brakes 60 and 62.

If actuation of the trailing vehicle brakes 60 and 62 only is desired, the lever arm 84 is moved to its first position indicated by the numeral 87, as shown in FIG. 2. This movement opens the valve 76 against the bias of the spring 80, connecting the conduit 66 to the discharge line 12, the fluid flowing in the second outlet port 58 and out the first outlet port 56, through the conduit 64 to the trailing vehicle brakes 60 and 62. The check valve 68 closes the outlet line 54 so that the fluid pressure is not transmitted to the tractor brakes 16 and 18. The trailing vehicle brakes 60 and 62 are thus actuated without depressing either brake pedal 28 or 30, and if it is desired to apply the tractor brakes 16 and 18 after the trailing vehicle brakes 60 and 62 are applied, the operator merely has to depress either or both brake pedals 28 or 30. Thus, if there is danger of the trailing vehicle jackknifing, the trailing vehicle brakes 60 and 62 can initially be applied, and the tractor brakes 16 and 18 can be later applied for added stopping power after the danger of jackknifing had disappeared. Conversely, if the trailing vehicle starts to jackknife after all the brakes are applied, the tractor brakes 16 and 18 can be released while the trailing vehicle brakes 60 and 62 are applied by shifting the lever arm 84 to its first position for operation of the trailing vehicle brakes only. As is apparent from FIG. 2, the movement of the lever arm 84 from its second position to its first position does not affect the valve 70, since the lost-motion mechanism absorbs said movement. The release of the lever 84 will return the actuating mechanism 82 to its normal or second position as shown in FIG. 1, the spring 80 biasing the mechanism toward its second position.

If joint or separate actuation of the tractor brakes 16 and 18 only is desired, the lever arm 84 is moved to its third position 89, as shown in FIG. 3, whereby the actuating mechanism 82 shifts the valve 70 to its closed position. The lost motion between the members 92 and 94 absorbs the movement of the lever arm 84 between its second and third positions so that the control valve 76 is not affected by the shift. If the right tractor brake pedal 28 is depressed to actuate the right tractor brake 16 as shown in FIG. 3, pressure is supplied to the right inlet branch 48. However, the check valve 52 prevents the flow of fluid to the left tractor brake 18 and the closed valve 70 prevents the flow of fluid to the trailing vehicle brakes 60 and 62. Conversely, separate actuation of the left tractor brake 18 results in the check valve 52 shifting to block the right tractor brake 16. When the lever arm 84 is released, the spring 72, which is under compression in the third position of the actuating mechanism, returns the actuating mechanism 82 to its second or normal position.

The embodiment shown in FIG. 4 is the same as the embodiment shown in FIGS. 1, 2 and 3 except that it includes means for equalizing the fluid pressure in the right and left tractor brakes 16 and 18 when the brakes are simultaneously operated. The brake system again includes right and left tractor brake control valves 24 and 26, respectively, actuated by right and left brake pedals 28 and 30 and interposed in right and left brake supply lines 20 and 22.

The supply lines 20 and 22 are interconnected between the brakes 16 and 18 and their respective control valves 24 and 26 by an equalizing passage 100, having right and left check valves 102 and 104 which are respectively oriented to prevent fluid flow from the right and left brake supply lines 20 and 22 to the central portion of the equalizing passage 100 between the check valves 102 and 104. The right check valve 102 is opened only by actuation of the left brake 18 either through pilot means 106, as shown in FIG. 4, or by a mechanical connection with the left brake control valve 26. Similarly, the left check valve 104 is opened only by actuation of the right brake 16 through pilot means 108 or by a mechanical connection with the right brake control valve 24. Thus, when both brakes are operated, both check valves 102 and 104 are opened and the equalizing passage 100 interconnects the brake lines 20 and 22 to equalize the pressure in the brakes 16 and 18.

A selector valve 110 is similar to the previously described selector valve 36 except that the valve body 112 has a non-bifurcated inlet line or conduit 114 connected to a single inlet port 116, which is connected to the equalizing passage 100 between the check valves 102 and 104 by a conduit 118.

Since the equalizing passage 100 between the check valves 102 and 104 is pressurized only when both tractor brakes are actuated, pressure can be transmitted through the open selector valve 110 to the trailing vehicle brakes 60 and 62 only when both tractor brakes 16 and 18 are actuated. Thus, unlike the embodiment shown in FIGS. 1, 2 and 3, it is impossible to obtain three wheel brakes, and when the tractor brake pedals 28 and 30 are depressed separately, only a single tractor brake will be actuated to facilitate the sharp turning of the tractor.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A hydraulic brake system for a tractor and a trailing vehicle comprising: a source of fluid pressure; tractor brakes; tractor brake control valve means for selectively supplying said fluid pressure to said tractor brakes; trailing vehicle brakes; trailing vehicle brake control valve means shiftable between a first position wherein it supplies fluid pressure to the trailing vehicle brakes and a second position wherein it disconnects the trailing vehicle brakes from the pressure source; a selector valve means shiftable between a first position wherein it transmits the tractor brake fluid pressure to the trailing vehicle brakes and a second position wherein it disconnects said tractor brakes and trailing vehicle brakes; and an actuating means operably connected to said trailing vehicle control valve means and said selector valve means for selectively placing both the selector valve means and trailing vehicle valve means in a first position, or placing both said selector valve means and trailing vehicle valve means in their second position, or placing the selector valve means in its first position and the trailing vehicle valve means in its second position.

2. The invention defined in claim 1 wherein the actuating means comprises a mechanism including a manually operated lever shiftable into three alternate positions to establish said three conditions of the actuating means.

3. The invention defined in claim 2 wherein the actuating mechanism includes a first lost-motion mechanism wherein the selector valve means is not shifted as the lever moves from its first position to its second position and a second lost-motion mechanism wherein the trailing vehicle valve means is not shifted as the lever moves from its second position to its third position.

4. The invention defined in claim 1 wherein the tractor brakes includes separate right and left tractor brakes and the tractor brake control valve means includes right and left brake valves respectively connected to the right and left tractor brakes for supplying fluid pressure to the respective brakes, said right and left brake valves being separately or jointly actuatable to incur separate or joint pressurization of the right and left tractor brakes.

5. The invention defined in claim 4 wherein the selector valve means is connected to the tractor brake means via bifurcated conduit means having a main line and two branches respectively connected to the right and left tractor brakes, the main line being connected to the selector valve means, said conduit means including a check valve means at the bifurcation for preventing the flow of fluid from one branch to the other branch while permitting the flow of fluid from either branch to said main line.

6. The invention defined in claim 4 wherein the trailing vehicle brakes are connected to the trailing vehicle control valve means and selector valve means via a bifurcated conduit means having a main line connected to the trailing vehicle brakes and a pair of branches, one branch being connected to the selector valve means and the other being connected to the trailing vehicle control valve means, said conduit means also including a check valve means at the bifurcation for preventing fluid flow from one branch to the other branch while permitting the fluid flow from either branch to the main line.

7. In a tractor having a source of fluid pressure, right- and left-hand brakes, and valve means for selectively pressurizing said brakes separately or in unison, and a trailing vehicle connectible to said tractor and having brakes and a supply line connected to the fluid pressure source, the combination therewith of a trailing vehicle brake control valve in said supply line shiftable between an open and a closed position; a selector valve having an inlet line connected to the tractor brakes and an outlet line connected to the trailing vehicle brake supply line and being shiftable between open and closed positions to connect and disconnect said inlet and outlet lines; and actuating means operably connected to the selector valve and trailing vehicle brake control valve for selectively establishing the open and closed conditions of said valves.

8. The invention defined in claim 7 wherein the actuating means comprises a mechanism including a lever arm shiftable into three positions to establish a first mechanism condition wherein the mechanism operably engages and opens both the selector valve and the trailing vehicle brake control valve, a second mechanism condition wherein the mechanism operably engages and opens the selector valve and closes the trailing vehicle brake control valve, and a third mechanism condition wherein the mechanism operably engages and closes both valves.

9. A hydraulic brake system for a tractor and a trailing vehicle comprising: a source of fluid pressure; right and left tractor brakes; tractor brake control valve means for selectively supplying said fluid pressure to either or both tractor brakes; a tractor brake equalizing passage means operatively interconnecting and pressurized by said right and left tractor brakes only when pressure is supplied to both tractor brakes; trailing vehicle brakes; trailing vehicle brake control valve means shiftable between a first position wherein it supplies fluid pressure to the trailing vehicle brakes and a second position wherein it disconnects the trailing vehicle brakes from the pressure source; a selector valve means connected to the equalizing passage means and the trailing vehicle brakes and shiftable between a first position wherein it transmits the fluid pressure in the equalizing passage means to the trailing vehicle brakes and a second position wherein it disconnects said equalizing passage means and said trailing vehicle brakes; and an actuating means operably connected to said trailing vehicle control valve means and said selector valve means for selectively placing both the selector valve means and trailing vehicle valve means in a first position, or placing both said selector valve means and trailing vehicle valve means in their second positions, or placing the selector valve means in its first position and the trailing vehicle valve means in its second position.

References Cited

UNITED STATES PATENTS

| | | | |
|---|---|---|---|
| 2,215,732 | 9/1940 | Bragg et al. | 303—8 |
| 2,266,817 | 12/1941 | Schober | 303—8 |
| 2,358,895 | 9/1944 | Vorech | 303—8 |

EUGENE G. BOTZ, *Primary Examiner.*